Figure 1:
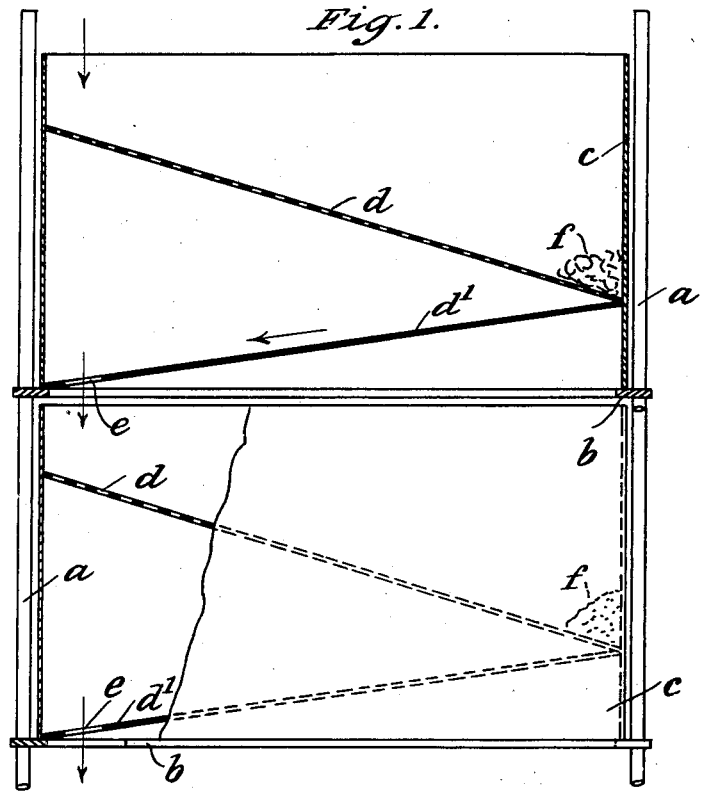

June 23, 1925.

W. S. RAWSON

TREATMENT OF HYDROMAGNESITE

Filed July 24, 1923

1,543,620

2 Sheets-Sheet 1

Inventor
William S. Rawson
By James L. Norris
Attorney

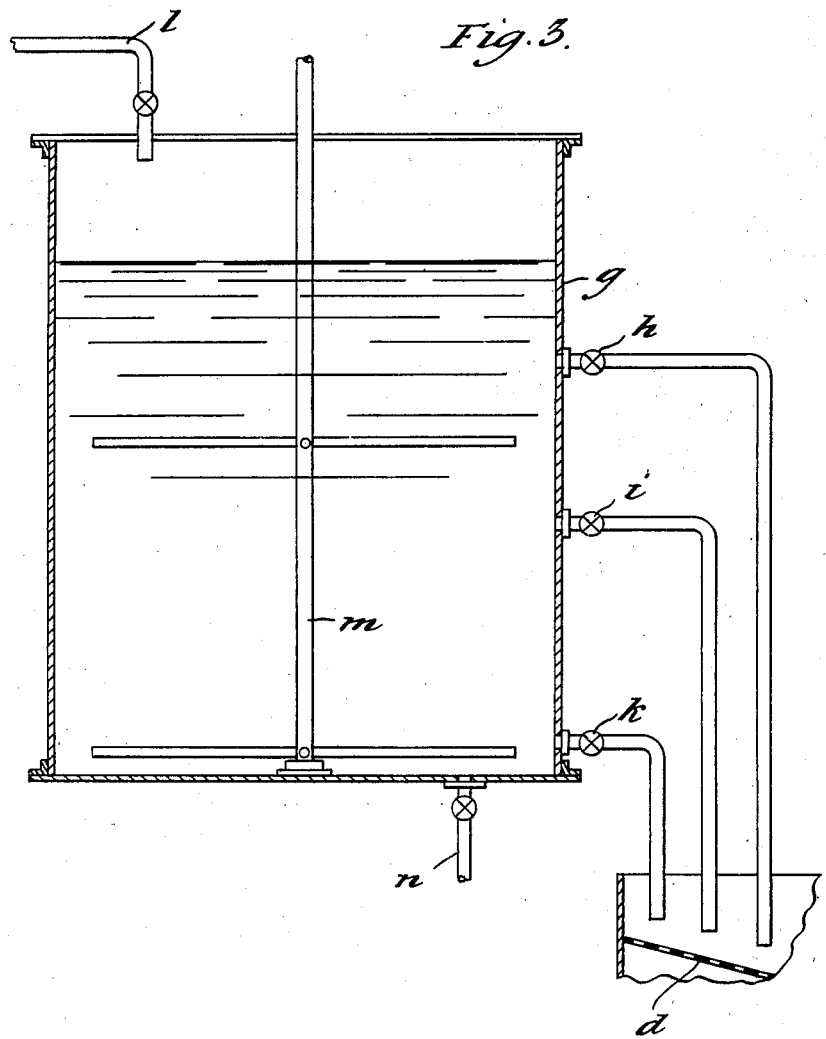

Patented June 23, 1925.

1,543,620

UNITED STATES PATENT OFFICE.

WILLIAM STEPNEY RAWSON, OF LONDON, ENGLAND.

TREATMENT OF HYDROMAGNESITE.

Application filed July 24, 1923. Serial No. 653,536.

*To all whom it may concern:*

Be it known that I, WILLIAM STEPNEY RAWSON, a subject of the King of Great Britain, residing in London, England, have invented certain new and useful Improvements in and Relating to the Treatment of Hydromagnesite, of which the following is a specification.

Hydromagnesite consists of basic magnesium carbonate containing impurities such as iron oxide, alumina, calcium carbonate and silica. The material dug from the natural beds also contains a small proportion of organic matter; some of this is of a cementitious nature, probably a resin or gum, which holds together the fine crystals of pure hydromagnesite in more or less coarse particles and in addition cements the crystals to the impurities.

For most of the applications of magnesia a high standard of purity is required. If the material as dug be ground as a preliminary to some concentration process for separating impurities, the organic matter, much of which is fibrous in character, would be subdivided and would afterwards be separated with difficulty by the concentration process; as the iron oxide is largely associated with this organic matter a hydromagnesite capable of being burnt to pure magnesia is scarcely obtainable unless the organic matter has been removed.

It is the object of this invention to purify or concentrate hydromagnesite without a preliminary grinding operation. In other words the invention seeks to detach the hydromagnesite particles, which, as already stated, are fine crystals, from the larger particles, and to break up the agglomerated masses so that the impurities may be separated by gravity or centrifugal treatment in known manner.

According to the invention the crude material is agitated with a comparatively small proportion of water, say twice its weight, and the temperature of the slurry so formed is raised to the boiling point or thereabouts by first agitating the crude material with a comparatively small proportion of water, say twice its weight and then raising the temperature of the slurry to boiling point or thereabouts, preferably by passing steam into it. The hot slurry is now rapidly cooled by mixing it with a large quantity of cold water. In this manner the fine crystals of hydromagnesite are detached in larger amount from the particles of impurity, and the aggregations of the crystals are more completely broken down, than is the case when cold water alone is used. The effect of this rapid cooling is not considerable unless the proportion of cold water used suffices to yield a mixture having a temperature below 75° F.

The heavier particles are then separated from the suspension in known manner, for example by settling or centrifuging, and the suspension is then run through a sieve having at least 80 meshes to the linear inch, whereby the coarser material is removed, and there is obtained, as the material which has run through the sieve, a hydromagnesite as fine as is required for most purposes and yielding a white magnesia on calcination.

In practice it is advisable to conduct the sieving in stages so as to prevent choking of the sieve. For example the effluent from the mixing tank may be run through six sieves in succession having respectively 80, 120, 140, 170, 200 and 240 meshes to the linear inch and preferably arranged as hereinafter described.

This treatment may be expected to yield a suspension containing particles of which from 8 to 20 per cent by weight will remain on a sieve having 240 meshes to the linear inch, the actual proportion varying with the type of hydromagnesite.

Figure 2:
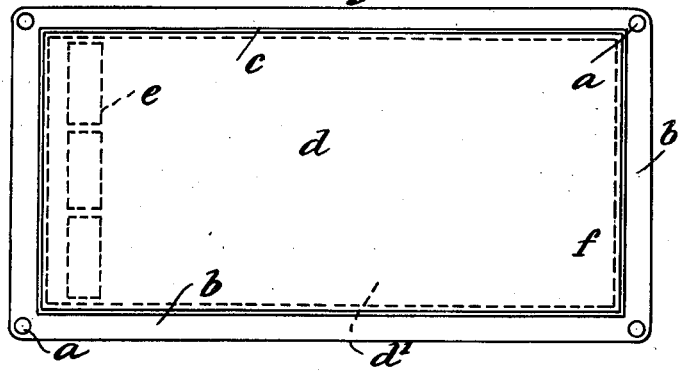

The process may be illustrated by the following example, referring to the accompanying drawings in which Fig. 1 is a sectional elevation of a frame carrying superimposed boxes containing sieves, Fig. 2 is a plan thereof and Fig. 3 is a vertical section through a cylindrical mixing tank in position to discharge its contents on the upper sieve of Fig. 1.

The cylindrical tank $g$ of suitable capacity say, 10 ft. x 8 ft. has three draw-off cocks namely $h$, $i$ and $k$, the lowest $k$ being at 6 inches from the bottom, the second $i$ at 3 ft. 6 inches from the bottom and the third $h$ at 3 ft. 6 inches from the top, is charged with 200 gallons of water through pipe $l$ into which 1000 lbs. of hydromagnesite are gradually added while a stirrer $m$, which is fitted to the tank, is kept at work so that a slurry is produced. Into this slurry open steam is passed through pipe $n$ while stirring is continued for say one hour, the time varying with the nature of the original material. Cold water is now run in through pipe $l$ until the tank is nearly full, the stirrer being kept at work. The action of the latter lifts the finer particles as the level of the water rises, the larger and heavier particles remaining at the lower levels. The stirrer is now stopped and the mixture at once drawn off through the several cocks in downward succession on the topmost sieve $d$ of the series of sieves illustrated in the diagram.

The latter represents a frame $a$ on the cross bars $b$ of which are supported bottomless boxes $c$ each containing a sieve $d$ inclined at a suitable angle, below which is a plate $d'$ inclined in the opposite direction and slotted at its lower end as at $e$. The successive sieves may have the meshes given above.

The mixture flowing on to the higher end of the topmost sieve flows down this, permitting water and fine particles to pass through to be received on the plate $d'$ while the coarser particles collect at the lower end of the sieve, as at $f$. The mixture flowing down the plate $d'$ passes through slots $e$ and is received on the upper end of the next sieve $d$ and so on throughout the series, the mixture which passes through the lowest sieve being collected in a settling tank. The material collected at the several places $f$ may be added to a fresh portion of slurry since the repeated action of steam disintegrates the particles still further. The next batch of hydromagnesite may be worked up in the same tank and this process may be continued until the accumulation of coarse particles in the tank renders it advisable to discharge them.

This arrangement of sieves has the advantage that when one is clogged or otherwise put out of action, it can readily be removed and another put in its place without stopping the flow of the mixture.

The settled, sifted slurry may be pressed and dried in any known manner.

When centrifuging is adopted instead of settling for separating the heavier particles, the material which has been suspended in water may be run into the centrifuge and the light material which flows away from the latter may be run through one or more sieves to separate the vegetable matter accompanying it.

When it is desirable that the final product should be free from resinous matter and in consequence of increased fineness of subdivision, it may be treated with methylated spirit or another mixture of a solvent which tends to dissolve resins and is itself soluble in water, such as acetone, with an oil soluble in the solvent but insoluble in water, such as petrol or benzone. The proportion of oil may be quite small, as is shown by the fact that the ⅜ per cent by volume of mineral naphtha in methylated spirit sufficient; in general 0.5 per cent by volume of petrol in alcohol or acetone is satisfactory.

The methylated spirit or other solvent is added to a slurry made by mixing the purified hydromagnesite with water with agitation in the manner already described and the suspension thus formed is run off into the settling tank at a level suitable for the grade of fineness required.

The solvent is more active at a raised temperature and the preferred procedure consists in mixing the slurry containing one part of the material to three parts of water with methylated spirit in the proportion of 4–6 gallons for each 1000 lbs. of material calculated as dry, then introducing open steam until the temperature is at the boiling point and finally stirring while adding much cold water as already described. The suspension is run off into the settling tank directly since the vegetable matter has already been removed.

Having thus described the nature of the said invention and the best means I know of carrying the same into practical effect, I claim:—

1. A process of treating hydromagnesite which consists in stirring the crude material with a small proportion of water to form a slurry, then heating the slurry to about the boiling-point, then mixing the hot slurry, while stirring, with cold water at least sufficient to produce a mixture having a temperature below 75° F., and then separating the heavier particles from the suspension and running the suspension through a sieve.

2. A process of treating hydromagnesite which consists in stirring the crude material with a small proportion of water to form a slurry, then heating the slurry to about the boiling-point, then mixing the hot slurry, while stirring, with cold water at least sufficient to produce a mixture having a temperature below 75° F., and then separating the heavier articles from the suspension and running the suspension through a sieve having not less than 80 meshes to the linear inch.

3. A process of treating hydromagnesite which consists in mixing the product of the process herein described with water to form a slurry, then mixing the slurry with a solvent which tends to dissolve resins, is itself soluble in water and contains an oil soluble in the solvent but insoluble in water, then stirring the mixture with a large quantity of water to form a suspension, separating the heavier particles from the suspension and recovering the fine crystals of hydromagnesite by settling the suspension.

4. A process of treating hydromagnesite which consists in mixing the product of the process herein described with water to form a slurry, then mixing the slurry with methylated spirit, then stirring the mixture with a large quantity of water to form a suspension, separating the heavier particles from the suspension and recovering the fine crystals of hydromagnesite by settling the suspension.

5. A process of treating hydromagnesite which consists in mixing the product of the process herein described with water to form a slurry, then mixing the slurry with a solvent which tends to dissolve resins, is itself soluble in water and contains an oil soluble in the solvent but insoluble in water, then heating the slurry to about the boiling point, then stirring the mixture with a large quantity of water to form a suspension, separating the heavier particles from the suspension and recovering the fine crystals of hydromagnesite by settling the suspension.

In testimony whereof I have signed my name to this specification.

WILLIAM STEPNEY RAWSON.